United States Patent [19]

Porath et al.

[11] Patent Number: 4,677,027

[45] Date of Patent: Jun. 30, 1987

[54] POLYMER COATED PARTICLES HAVING IMMOBILIZED METAL IONS ON THE SURFACES THEREOF

[75] Inventors: Jerker Porath, Lidingö; Mats Lindahl, Upsala, both of Sweden

[73] Assignee: Exploaterings AB T.B.F., Uppsala, Sweden

[21] Appl. No.: 786,857

[22] Filed: Oct. 11, 1985

[30] Foreign Application Priority Data

Oct. 19, 1984 [SE] Sweden ................................ 8405241

[51] Int. Cl.$^4$ ...................... B32B 15/08; B32B 19/02; B32B 19/04
[52] U.S. Cl. ..................................... 428/407; 427/221; 427/302; 428/403; 428/411.1; 428/478.2; 428/522; 428/532
[58] Field of Search ................ 428/403, 407; 435/173, 435/176, 178, 803; 427/221, 302

[56] References Cited

U.S. PATENT DOCUMENTS 3,783,101  1/1974  Tomb et al. ......................... 435/176

FOREIGN PATENT DOCUMENTS

WO84/01503  4/1984  PCT Int'l Appl. ................. 435/173

*Primary Examiner*—Allan M. Lieberman
*Attorney, Agent, or Firm*—Young & Thompson

[57] ABSTRACT

A solid phase can be coated superficially with a polymeric coating by substituting immobilized metal ions on the surface of the solid phase with a hydrophilic polymer or a derivative or aggregate thereof, through a chemisorption process. The solid phase may comprise a magnetic material, such as magnetite, and may have a particle form. The coating can be produced by bringing the solid phase into contact with a solution of a reagent which includes at least one metal chelating and one reactive group, and subsequently bringing the solid phase into contact with a solution of a compound which reacts with the chelater reagent adsorbed on the solid phase. The polymer layer may constitute a polyhydric alcohol, a polyamine, or a polyamide, for example a polysaccharide, such as agarose, a protein or a peptide, a polyacryl amide, etc. and the reactive group may be a vinylsulphone or an epoxide, an aminothiol or a hydroxyl. The metal-chelate forming group is preferably a carboxy-methylated amine and the soluble compound is a water-soluble polymer, such as dextran, polyethylene glycol, dextran or some other polysaccharide.

19 Claims, No Drawings

POLYMER COATED PARTICLES HAVING IMMOBILIZED METAL IONS ON THE SURFACES THEREOF

A novel method of coating the surface of a metal or insoluble metal compound with a monomolecular polymeric layer is IMA-technique (Immobilized Metal Ion Affinity) and is based on the ability of metals and insoluble inorganic compounds that contain metal ions at the phase boundary to combine with a polymer that has been substituted with a metal chelate builder.

It is possible to convert soluble polysaccharides to metal-binding glyco-conjugates. These glyco-conjugates include a plurality of metal chelating groups for each polymer molecule and, in addition, an excess of hydroxyl groups (or aldehyde functions etc.) which can be utilized for coupling biologically active components.

The glyco-conjugate can be fixed to particles incorporating metal ions at their surfaces, e.g. magnetite, metal-ion derivated silica-gel particles etc. In principle, it is possible to synthesize highly permeable lattices which permit adsorption of biological material from molecules to cells.

Polymer coated metal particles and metal-oxide particles open new avenues for the separation, isolation and immobilization of biological macro-molecules and particles (virus, cells, etc.) both in the laboratory and in the workshop—techniques which compete on equal terms with and in certain instances are superior to chromatographic methods, or which can be used in instances where chromatography cannot be used at all. In respect of metal nuclei or cores in general, highly effective fluidized bed processes may be applied. When the particles are magnetic, these particles can be separated from solution and non-magnetic solids by placing them in a magnetic field.

There are many methods by which the surfaces of metal can be coated with a polymer. The normal intention is to protect the surface of the metal with a plastics layer. In certain cases it may be desirable instead to affix solely an extremely thin layer of molecular thickness, for example the bonding of heparin to inner vessels and tubes in apparatus for through-pumping blood in surgical operations, so as to prevent coagulation.

Gel particles which have a heavy inner, impermeable and chemically resistant core have interesting fields of use within bio-technology. Chromatographic processes can often instead be conducted in beds at very high flow rates. This is true in those cases where there is unilateral material distribution between an immovable phase (fixed) and a movable phase. This is practically always the case in the biospecific adsorption of proteins, nucleic acids and polysaccharides, and also in a wealth of other adsorption processes for the aforesaid biopolymers.

The adsorption process is greatly restricted by diffusion at high flow rates in the gel-particle beds. It is therefore important that the diffusion path is decreased, and consequently from this aspect the layer or coating should be as thin as possible. The bed must be given a very high specific surface area, in order to compensate for the low adsorption capacity. Both of these requirements can be satisfied by constructing the bed from extremely small, heavy particles embraced by a molecular polymeric layer or coating having bound thereto those centres which produce the adsorption. Our product according to the invention provides a solution to the problem and is based on a technique of fixing polymers, preferably water-soluble polymers, to surfaces which incorporate immobilized metal ions, particularly heavy metal ions belonging to the first series of transition elements, preferably iron, cobalt, nickel and copper, but also aluminium, zinc, cadmium, silver, gold and platinum metals. In principle, of course, other heavy metals, for example rare earth metals, aluminium, tallium, zirconium, thorium and uranium can also be surface treated with a molecular polymeric coating according to the invention. The main requirement is, after all, that insoluble metal complexes can be formed and consequently all insoluble metal compounds having superficial metal ions, such as oxides and sulphides, can be surface coated with polymers in accordance with the method of the invention.

The manufacture of gel particles which incorporate magnetic cores has been known to the art since the 1950's, when magnetite was embedded in ion exchangers. Polymer particles containing magnetite have also been used to increase the flow through filter cakes. The first magnetic gel particles for immobilizing proteins were described in 1973, and since then a number of articles and reviews have been published on the subject. It is obvious that the invention described by us can be used for the same purpose.

Example 1 illustrates how the invention can be applied to purify neuraminic acid-specific pilae from Coli-cells. Since pilae are extremely long and narrow molecules having a molecular weight in the order of $10^6$ Daltons, chromatographic gel material is not suited for cleaning purposes. Particles formed in accordance with the invention, however, present a readily penetrated polymer layer, which enables very high adsorption capacities to be achieved with both large and small molecules.

Those manufacturing methods applied hitherto are based on the inclusion of a magnetic core in a gel-forming polymer, e.g. agarose, or the polymerization of a suitable monomer, e.g. acrolein, in which magnetic particles are suspended and subsequently breaking-up the resultant gel composite. It is difficult, if not to say impossible, to obtain a uniform gel layer of given thickness by means of such methods. It must be admitted, however, that the polymerization of acrolein is a very neat solution to the problem, particularly since the polymer is "auto-activated" and can therefore be used immediately to couple proteins. On the other hand, the resultant polymer is quite hydrophobic and, above all, has limited permeability.

We promote a novel technique for coating metal surfaces with a hydrophilic polymer, which can be expected to acquire a very wide usage. In our application of this "hydrophilizing technique" for separation and extracting purposes, we coat the metal surface with a *non-cross-linked* polymer. This means that practically the whole polymer is available to all molecules and particles, e.g. virus and cells. In this way there is obtained a macro-environment which is suitable for adsorption and which exhibits a very large adsorption surface area in relation to the surface area of the core particles. The method presumes that the surfaces of the metals (or metal compounds) are coated with metal ions, as are in fact all non-precious or base metals. The hydrophilized particle can be made heavy and also magnetic, by appropriate selection of the metal or metal compound. The primary layer or coating can be formed by "steeping" the particles in a polymeric solution and thereafter cross-linking the polymer. It is true that a thicker coating will be obtained, but it can still be highly permeable and presents a "frayed" outer surface. "Steeping" will also provide a more uniform polymer layer than those methods used hitherto for producing magnetic particles for adsorbing cells and molecules of biological interest. A further advantage lies in the possibility of building-up the layer or coating from different polymers.

The product according to the invention can be obtained by reacting the superficial metal-ions in the solid phase—hereinafter referred to as M—with a group which binds strongly to M. L may suitably be metal-ion chelating or sulphide-forming sulphur, i.e. a thiol group. If L is bound to a polymer, there is immediately obtained therefrom a surface-coating in accordance with the invention. The product according to this version of the invention can thus be symbolized M-L-P.

According to another version of the invention the polymer P* is coupled to M in another way, namely over a link or bridge-R-Y-located between L and P. In this case a substance L-R-X is allowed to react with a polymeric derivative Z-P, the substituents X and Z forming the bridge component Y by addition or condensation optionally followed by reduction.

Illustrations of such bridge forming reactions are:
2-aminomethyl-8-hydroxy quinoline

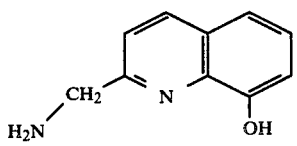

one example of a substance of type L-R-X where L is

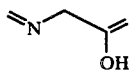

and X is $NH_2$ and R represents remaining components of the molecule. The reaction with M produces an adsorption complex (adsorbate) of a chelate nature, which in turn is able to react with a reactive polymer, e.g. an aldehyde starch, ZP with Z=—CHO. If the reaction product is reduced, for example, with sodium borhydride, there is obtained a stable coupling of the starch derivative to the 8-hydroxy quinoline, which is in turn firmly bonded to the metal:

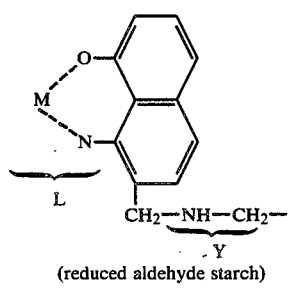

(reduced aldehyde starch)

Reactions can also be used in another sequence to produce the product according to I. If LRX is instead based on 8-hydroxy quinoline-2-aldehyde, the polymer may include $Z=NH_2$, e.g. an amined aldehyde starch.

The product I is obtained subsequent to adsorption of the aldehyde on the metal-ion followed by reduction.

It will thus be seen that when synthesizing the product, X and Z may be allowed to change places among the two reactants LRX and Z-P. The direction of the atoms in a chain will then be reversed. This is clear from the following example:

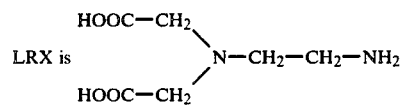

and Z-P is carboxy-methylated agarose, symbolized as $HOOC—CH_2$— (agarose) to indicate the presence of reactive hydroxyl groups. The product then obtains the symbolic formula:

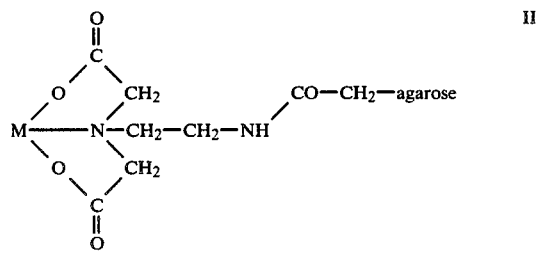

If we depart instead from amino agarose and β-dicarboxymethyl propionic acid the following product is obtained:

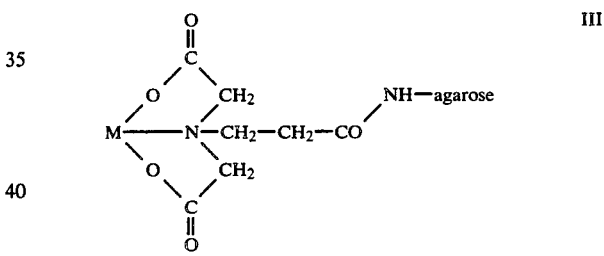

The bond Y is thus —NH—CO$\overline{\phantom{x}}$ in the one case and the "retro-grade" sequence —CO—NH$\overline{\phantom{x}}$ in the other.

Particular mention must be made to two extremely useful reactions for producing the product according to the invention, namely the respective reactions of oxirane and divinyl sulphones with Z-hydroxyl-, amino($NH_2$; NHR where N is alkyl or aryl) and thiol groups. LRX can then be illustrated symbolically as

and L—R—$SO_2$—CH=$CH_2$ respectively when Z in ZP is OH, $NH_2$, NHR, or —SH. If X is OH, $NH_2$, NHR or —SH, coupling to the polymer can be effected when the polymer contains oxirane or vinyl-sulphonyl groups.

The preparation of LRX as a pure chemical substance may be complicated. In this case there can be used in the preparation of a product according to the invention a mixture of components of which each fulfils the conditions for LRX. As an example, we can depart from tetraethylene pentamine. This substance forms strong complexes with Cu(II). It contains an excess of $NH_2$— groups and consequently fulfils the conditions for LRX when M is copper. Since the complexes formed with Fe(III) are very weak, the conditions for iron are not fulfilled. In this case the tetraethylene pentamine can be partially carboxy-methylated, therewith to obtain a mixture of differently substituted polyamine, e.g.

The product can therewith be described by the following formula:

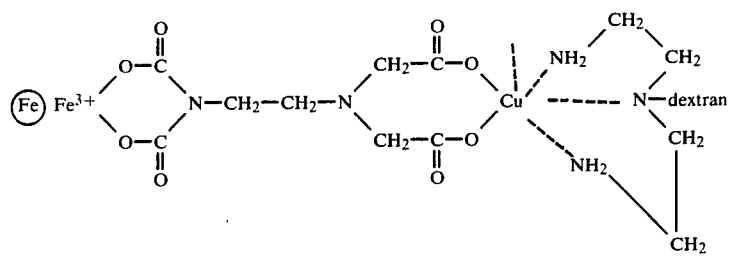

The preparation of the product according to the invention can be generally described in the following way:

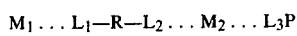

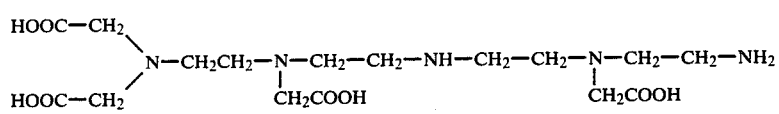

and

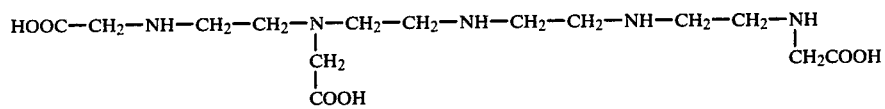

Several of the derivatives are able to form adsorption complexes with Fe(III) and other heavy metal ions and simultaneously have groups (—NH— or NH₂) capable of functioning as X for coupling to ZP or for activation with a group Z incorporating, for example, oxirane or a vinyl sulphonyl group. A practical application of the method for cases such as this is illustrated by Example 2 below.

It may be difficult to produce the reactants LRX in a pure form. Pure reactants are not necessary in the synthesis of the product according to the invention. For example, if we depart from tetraethylene pentamine and carboxy-methylate this amine with insufficient monohaloacetic acid in alkaline solution (bromacetate for example), there is obtained a complicated mixture of derivatives, of which IV and V illustrate two examples.

A further variant of the invention should be mentioned, namely where Y is also a metal complex. The following examples are given, in which LRX is

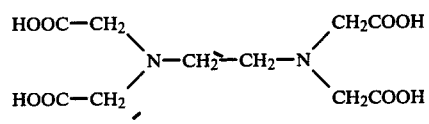

and ZP is

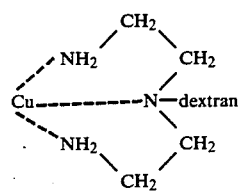

M=magnetite symbolized FeFe³⁺.

where $M_1$ and $M_2$ may be the same or different metal-ions and where $L_1$, $L_2$ and $L_3$ may be the same or different metal-binding groups.

EXAMPLE 1

1.5 g magnetic particles (diameter approximately 0.4 μm) were incubated with 0.5 g iminodiacetate dextran (IDA-dextran) and shaken overnight in 0.5M NaHCO₃—Na₂CO₃ buffer, pH 11. The IDA-dextran was herewith complex-bound to the metal particles. Subsequent to washing with distilled water followed by the above buffer, dextrans were activated with 1% divinyl sulphone (DVS) dissolved in the buffer. After 1 h.40 mins, excess DVS was washed away with the buffer. The particles were then slurried in 10 ml of a buffer solution according to the above, containing 10% dextran T 500 and allowed to stand at room temperature overnight. More dextran was herewith coupled to the surfaces of the particles. The procedure was repeated after washing the particles, although this time with a 5%-DVS. Finally the particles were activated with 2% DVS and divided into two equal portions. One portion was coupled with 0.15 g colominic acid in 1.5 ml buffer (pH 11). The other portion was coupled with 0.15 g transferrine in 1.5 ml bicarbonate buffer, pH 9.0.

It was possible to elute 1.5 mg K99 pilae from *E.coli* for each gram of particles from the transferrine-substituted gel, and 0.65 mg/g from the colominic-acid particles. With regard to the colominic-acid particles, the result achieved was about 20 times more favourable than that achieved with colomine-substituted Sephadex G10.

An estimation of the theoretical maximum adsorption capacity of a gel-coated magnetite preparation in which the magnetite has a specific surface of about 3 m²/g indicated that it should be possible to increase the capacity about a further ten times. The result achieved, however, is already highly satisfactory.

EXAMPLE 2

Magnetite particles coated with agar gel

Principle: To immobilize agarose with the aid of a novel technique based on metal-ion affinity 1. Chelaters+bifunctional activaters→monofunctional activated chelater derivative.
2. +Magnetite→particle surface coated monofunctionally activated chelater derivative→"active magnetite".
3. +Polymer→polymer covered magnetite (=end product).

Routine: Partial carboxy-methylation of TEPA.

6 ml TEPA (tetraethylene pentamine) were added to 28 g bromacetic acid neutralized with NaOH+100 ml 1M $Na_2CO_3/NaHCO_3$, pH 11, and allowed to react for two hours at room temperature while shaken.

50 g powdered magnetite were added and the suspension shaken for two hours and washed with distilled water to a neutral pH by decantation. The product was finally washed with 0.1M $Na_2CO_3$.

The magnetite (in the reaction flask) +
100 ml 0.1 M $Na_2CO_3$ +
5 ml divinyl sulphone
} shaken for two hours Washing in distilled water (decantation) EDA-agar (corresponding to 1.25 g dry gel) was added and allowed to stand overnight while shaken. The pH was adjusted to 9.8 with $Na_2CO_3$.

The product was washed in distilled water to a neutral pH.

We claim:

1. A product for the separation of biological molecules and particles, consisting essentially of a solid phase having immobilized metal ions M on its surface substituted by means of chemisorption via a metal chelate bond or metal sulphide bond L with a first polymer P to produce a product M-L-P or, alternatively, said solid phase M and bond L over a bridge R-Y consisting of a second polymer R and a cross-linking agent Y is coupled to said polymer P to produce a product M-L-R-Y-P, the polymers R and P, which may be identical or different, being selected from the group consisting of polyhydric alcohol, polyamine, polyamide, polyether and polyester.

2. A product according to claim 1, in which solid phase is in particle form.

3. A product according to claim 1, in which said cross-linking agent Y is formed by a further metal ion cooperatively bound by metal chelating substituents X and Z, said substituents X and Z being bound to said second and first polymers R and P, respectively, whereby said cross-linking agent Y has the form X-further metal ion-Z and said product has the form M-L-R-X-further metal ion-Z-P, said metal chelating substituents X and Z being both selected from the group consisting of polyamines, carboxymethylated amines, thiolic and phenolic groups.

4. Product according to claim 1, in which said solid phase is a magnetic material.

5. A product according to claim 3, in which R or P is a polysaccharide.

6. A product according to claim 3, in which R or P is a polyacryl amide.

7. A product according to claim 3, in which R or P is a protein or a peptide.

8. A product according to claim 3, in which R or P is an oligonucleotide or a polynucleotide.

9. A product according to claim 2, in which R or P is incorporated in the surface of a particle.

10. A method of fixing a water soluble polymer P to the surface of a solid phase M which in the phase boundary includes insoluble metal ions immobilized at the phase boundary, comprising contacting the solid phase with a solution of a reagent, said reagent comprising at least one metal-chelate forming group capable of adsorbing on the solid phase and a reactive group L, and by subsequently contacting the solid phase with a solution of said polymer P which reacts with said reactive group L of said reagent.

11. A method according to claim 10, in which said polymer P is a polysaccharide.

12. A method according to claim 10, in which said polymer P is a protein or a peptide.

13. A method according to claim 10, in which said polymer P is a polyacrylamide.

14. A method according to claim 10, in which said solid phase M is in particle form and comprises particles having a diameter below 1 mm.

15. A method according to claim 14, in which said particles are magnetic.

16. A method according to claim 10, in which said reagent is a water-soluble polymer.

17. A method according to claim 10, in which said reactive group is a vinyl sulphone or an epoxide.

18. A method according to claim 10, in which said reactive group is an aminothiol or hydroxyl group.

19. A method according to claim 10, in which said metal-chelate forming group is a carboxy-methylated amine.

* * * * *